(12) United States Patent
McCue

(10) Patent No.: US 11,592,076 B2
(45) Date of Patent: Feb. 28, 2023

(54) SHOCK ABSORBING STRUCTURE

(71) Applicant: Geoff McCue, Lawrence, KS (US)

(72) Inventor: Geoff McCue, Lawrence, KS (US)

(*) Notice: Subject to any disclaimer, the term of this patent is extended or adjusted under 35 U.S.C. 154(b) by 0 days.

(21) Appl. No.: 17/302,181

(22) Filed: Apr. 26, 2021

(65) Prior Publication Data

US 2022/0341483 A1 Oct. 27, 2022

(51) Int. Cl.
*F16F 13/06* (2006.01)
*A43B 13/18* (2006.01)
*B32B 25/20* (2006.01)
*A63B 71/14* (2006.01)
*A42B 3/12* (2006.01)

(52) U.S. Cl.
CPC ............ *F16F 13/06* (2013.01); *A43B 13/189* (2013.01); *A63B 71/143* (2013.01); *B32B 25/20* (2013.01); *A42B 3/121* (2013.01); *A63B 2209/00* (2013.01); *B32B 2307/536* (2013.01); *B32B 2307/56* (2013.01); *F16F 2224/025* (2013.01); *F16F 2224/048* (2013.01)

(58) Field of Classification Search
CPC ........ A43B 13/189; A42B 3/121; F16F 13/06; F16F 2224/025; F16F 2224/048; F16F 13/08; F16F 13/085; F16F 13/10; F16F 13/101; F16F 13/102; F16F 13/108; B32B 25/20
See application file for complete search history.

(56) References Cited

U.S. PATENT DOCUMENTS

| | | | | |
|---|---|---|---|---|
| 4,338,734 A | * | 7/1982 | Schwartz | A43B 7/22 36/44 |
| 4,769,926 A | * | 9/1988 | Meyers | A43B 13/40 36/43 |
| 5,564,202 A | * | 10/1996 | Hoppenstein | A43B 13/18 36/25 R |
| 5,756,195 A | * | 5/1998 | Allen | B32B 27/06 428/313.5 |
| 5,985,383 A | * | 11/1999 | Allen | A43B 19/00 525/218 |
| 6,976,321 B1 | * | 12/2005 | Lakic | A43B 7/141 36/28 |

(Continued)

FOREIGN PATENT DOCUMENTS

| | | | | |
|---|---|---|---|---|
| CN | 114347572 A | * | 4/2022 | |
| EP | 759276 A2 | * | 2/1997 | A43B 13/04 |

(Continued)

OTHER PUBLICATIONS

Various Authors, "Non-Newtonian fluid", Wikipedia. <https://en.wikipedia.org/wiki/Non-Newtonian_fluid>. Accessed Apr. 14, 2022.

(Continued)

*Primary Examiner* — Thomas J Williams
(74) *Attorney, Agent, or Firm* — Intellectual Property Consulting, LLC; Bernard F. Meroney

(57) ABSTRACT

An apparatus comprised of a first portion comprising a generally flexible fabric, and a second portion or layer comprising a gel material formed in a generally planar rectangular shape. Positioned below the second layer is a third portion or a damping layer having a series of dampers positioned thereon, where the dampers are elastomeric flexible and compressible. The three portions are laminated together.

26 Claims, 5 Drawing Sheets

(56) References Cited

U.S. PATENT DOCUMENTS

| | | | | |
|---|---|---|---|---|
| 7,784,197 B2* | 8/2010 | Crane | ............... | A43B 7/1415 36/43 |
| 9,587,080 B2 | 3/2017 | Singh | | |
| 2001/0015022 A1* | 8/2001 | Singer | ............... | A43B 7/1425 36/35 R |
| 2001/0045028 A1* | 11/2001 | Crane | ............... | A43B 7/1415 36/43 |
| 2002/0092203 A1* | 7/2002 | Hardt | ............... | A43B 13/12 36/43 |
| 2003/0123917 A1* | 7/2003 | Willat | ............... | B25G 1/10 401/6 |
| 2004/0103561 A1* | 6/2004 | Campbell | ............ | A43B 23/17 36/155 |
| 2009/0142551 A1* | 6/2009 | Fox | ............... | B32B 5/245 427/331 |
| 2009/0162596 A1* | 6/2009 | Rios | ............... | B32B 23/10 428/141 |
| 2009/0300949 A1* | 12/2009 | Frederick | ............ | A43B 13/189 36/35 R |
| 2014/0115920 A1* | 5/2014 | McCue | ............... | F16F 3/0873 36/28 |
| 2015/0272271 A1* | 10/2015 | Campos, II | ............ | B29D 35/128 36/29 |
| 2016/0053843 A1* | 2/2016 | Subhash | ............... | B60R 19/20 267/140.11 |
| 2020/0113277 A1* | 4/2020 | Davis | ............... | A43B 13/127 |
| 2020/0229539 A1* | 7/2020 | Wu | ............... | A43B 17/026 |
| 2020/0305534 A1* | 10/2020 | Chilson | ............... | B32B 3/04 |

FOREIGN PATENT DOCUMENTS

| | | | | |
|---|---|---|---|---|
| KR | 20110038384 A | * | 4/2011 | |
| WO | WO-2015077044 A1 | * | 5/2015 | ........... A41D 13/015 |

OTHER PUBLICATIONS

Various Authors, "Shock (mechanics)", Wikipedia. <https://en.wikipedia.org/wiki/Shock_(mechanics)>. Accessed Apr. 4, 2022.

Various Authors, "Anatomy of the Shoe", Shoe Guide. <https://www.shoeguide.org/shoe_anatomy/>. Accessed Apr. 18, 2022.

Various Authors, "Longitudinal Wave", Wikipedia. <https://en.wikipedia.org/Longitudinal_wave>, Accessed Jul. 24, 2022.

* cited by examiner

SHOCK ABSORBING STRUCTURE

FIELD OF THE INVENTION

One or more embodiments of the invention generally relate to a shock absorbing structure containing a dampening layer positioned beneath a gel layer. More particularly, one or more embodiments of the invention relate substantially to a gel layer with a hardness on the Shore OO scale in the range of 00-60.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that a shock absorber is a mechanical device designed to smooth out or damp shock impulse and dissipate kinetic energy.

Typically, shock absorbers are an important part of automobile and motorcycle suspensions, aircraft landing gear, footwear, safety wearables, and the supports for many industrial machines. Large shock absorbers have also been used in structural engineering to reduce the susceptibility of structures to earthquake damage and resonance.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings in which like reference numerals refer to similar elements and in which.

Figure 1A:
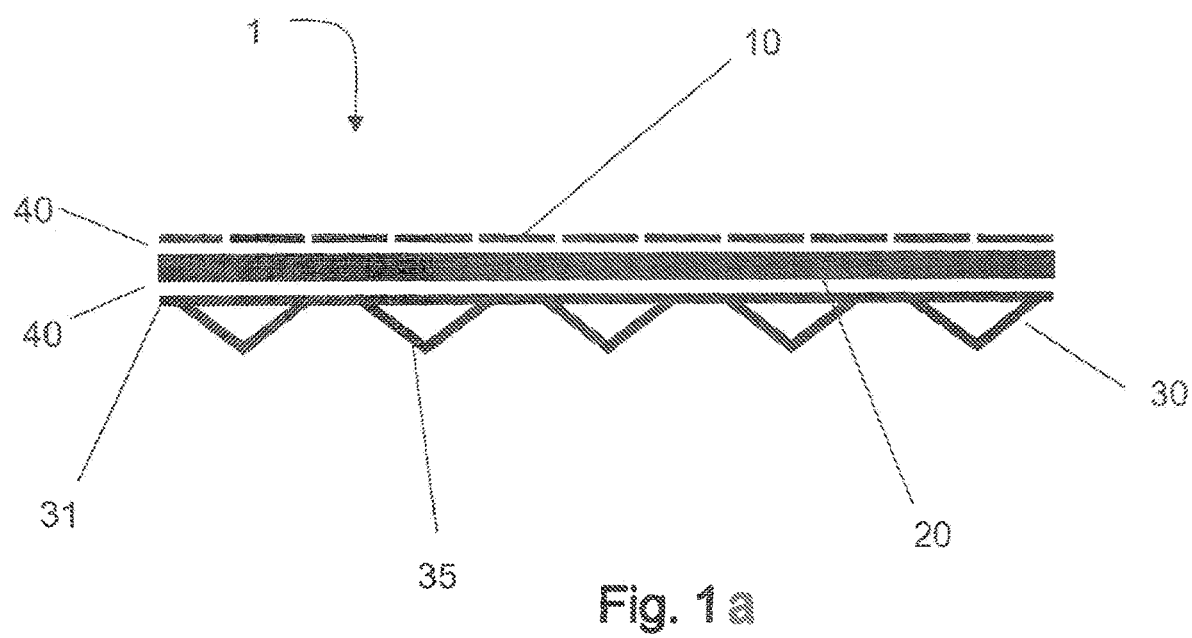
FIG. 1A is a cross-section view through one embodiment of the invention.

Unless otherwise indicated, illustrations in the figures are not necessarily drawn to scale.

DETAILED DESCRIPTION OF SOME EMBODIMENTS

Embodiments of the present invention are best understood by reference to the detailed figures and description set forth herein.

Embodiments of the invention are discussed below with reference to the figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications described herein, as these may vary. It is also to be understood that the terminology used herein is used for the purpose of describing particular embodiments only and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicant hereby gives notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment; although they may.

As is well known to those skilled in the art, many careful considerations and compromises typically must be made when designing for the optimal manufacture of a commercial implementation of any system; and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application. The present invention will now be described in detail with reference to embodiments thereof as illustrated in the accompanying drawings.

Figure 2A:
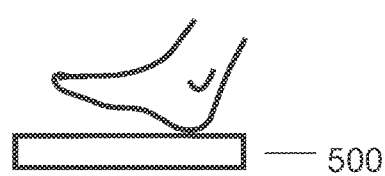
FIG. 2A is an illustration of a side view of foam layer in response to an applied force from a foot.
Figure 2A:
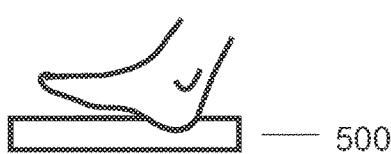
Figure 2B:
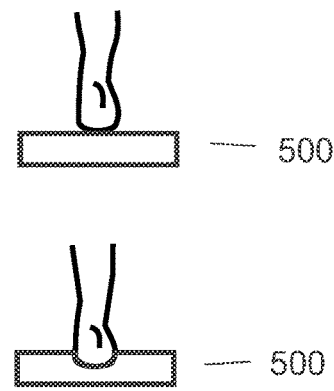
FIG. 2B is an illustration of a rear cross-sectional view of a foam layer in response to an applied force from a foot.

There are various types of damper devices that are provided in the prior art. Many damper devices are solid fingers or cylinders that extend away from an attachment surface. These damper devices absorb an applied force primarily by compression; bending can also occur. One prior art invention shows a triangular V-shaped hollow or open center damper device. See U.S. Pat. No. 9,271,542, hereby incorporated by reference. These hollow center dampers absorb shock by compression and flexing or bending. In prior art designs, the damper devices would be positioned below a shock absorbing layer, such as a foam layer or a rubber-like layer. In this type of layer, shock absorption occurs by compression of the layer directly in the area of the applied force. The compression and compression effect are localized. In a foam layer, an applied force or impact will compress the foam 500, thereby absorbing the kinetic energy. The foam 500 layer is the immediate vicinity of the applied shock compresses, thereby absorbing the kinetic energy of the impact. The compaction occurs in the immediate area (the impact zone), and compaction does not extend much beyond the contact area. See FIGS. 2A and 2B. A similar response is achieved using a hard or semi-hard layer, such as with a silicon rubber layer.

One embodiment of the present shock absorbing structure is shown in FIG. 1A. As shown, the shock absorbing structure 1 has a top tough flexible layer 10, such as a fabric layer of cotton, polyester, rayon, nylon, hemp, or other material depending on the application. Below the fabric layer 10 is a soft gel layer 20, such as a silicone gel layer. One suitable gel layer is a soft silicone gel, such as Roylan-brand clear medical grade gel padding. Preferably, the gel layer has a hardness on the Shore OO scale in the range of 0-60, more preferably in the range of 10-40, most preferably in the range of 15-35. A silicone gel is believed to be, generally, a long chain silicone polymer (polysiloxanes), and silicone dioxide forming a lightly cross-linked silicone elastomer whose polymer network has been swollen with silicone fluids or, less commonly, non-silicone fluids, such as mineral oil.

Figure 4A:
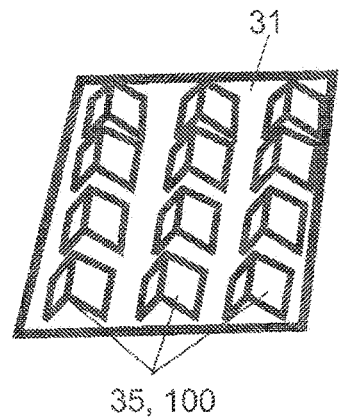
FIG. 4A is a top perspective view of the damper layer where the dampers are triangular V-shaped forms.
Figure 4B:
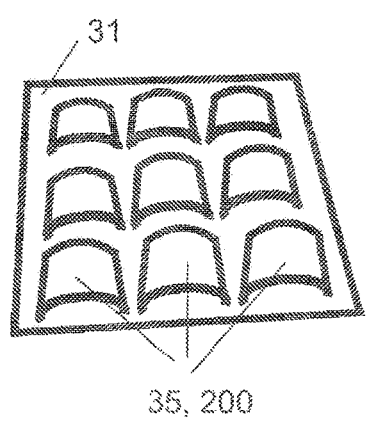
FIG. 4B is a top perspective view of the damper layer where the dampers are half cylinders.
Figure 4C:
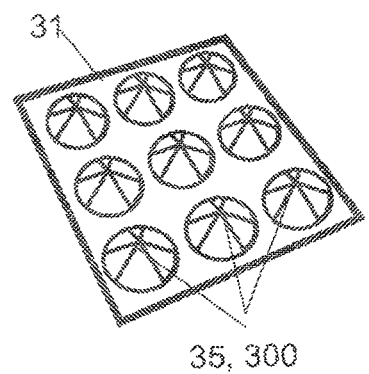
FIG. 4C is a top perspective view of the damper layer where the dampers are hemispheres

Below the gel layer 20 is a damper layer 30, which contains a flexible elastomeric layer or base fabric 31 on which geometrical shaped dampers 35 are adhered. As shown in FIG. 4B, one embodiment of the hollow geometrical figure is a half cylinder 200; in FIG. 4A, another damper form 35 is an open triangular shape, or "V" shape 100, and in FIG. 4C, another damper form shape is a hollow hemispherical shape 300. The forms may be closed or open, but preferably are hollow.

The shock absorbing material 1 has the three layers: 10, 20, and 30, laminated into a single shock absorbing structure using a suitable flexible adhesive 40 between the layers. Preferably, the adhesive or a flexible elastomeric sealing agent is positioned on the side edge of the gel layer 20. One suitable adhesive is a contact cement, which is elastic and flexible when cured. The adhesive layer prevents slippage between adjacent layers but leaves the gel layer 20 free to move between the adhesive layers, and the damper layer 30 to move in response to the gel layers 20. The laminated structure allows all layers to work together to achieve a greater shock absorbing effect than prior art devices. A hollow three-dimensional damper form 35 will more readily bend or compress in response to a traveling wave in the gel layer 20, and hence, hollow damper forms are preferred.

Figure 1B:
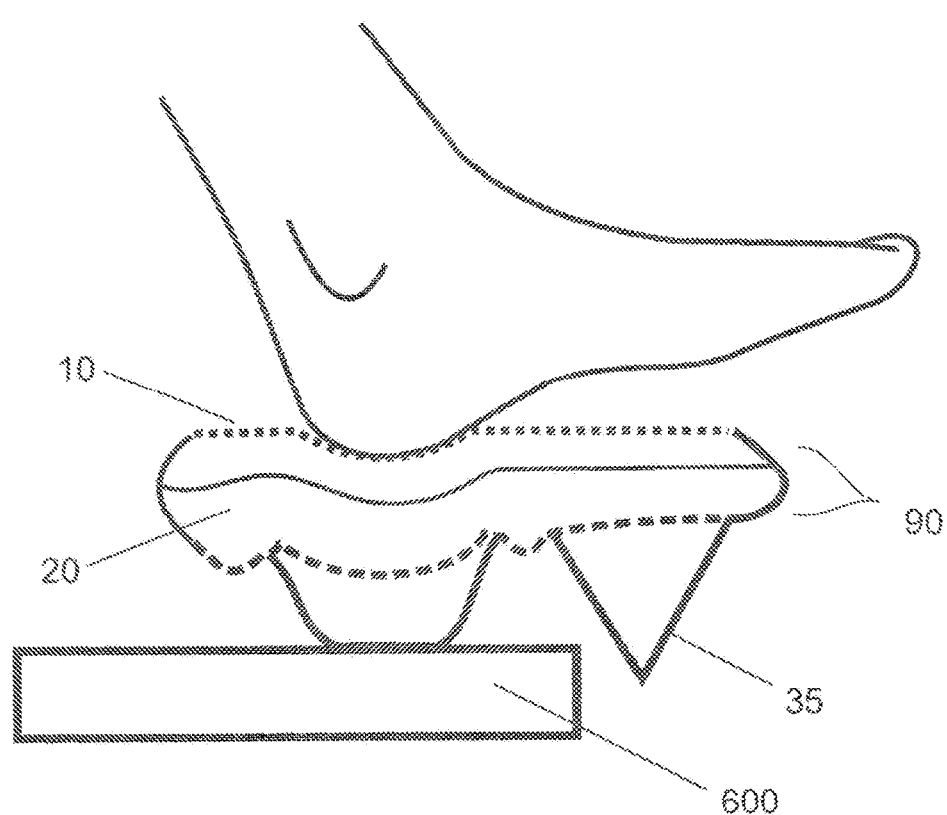
FIG. 1B is a side cross-sectional view of one embodiment of the invention responding to an impact force caused by a foot.
Figure 3A:
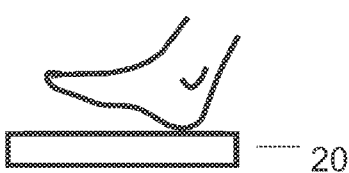
FIG. 3A is an illustration of a side cross-sectional view of gel layer in response to an applied force from a foot.
Figure 3A:
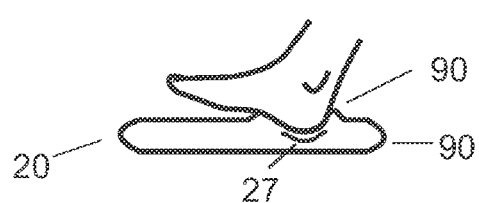
Figure 3B:
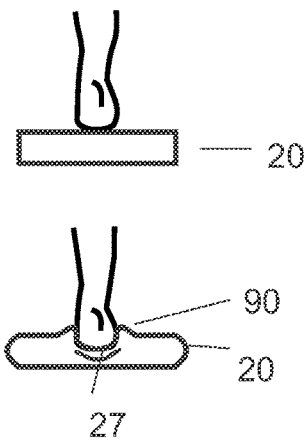
FIG. 3B is an illustration of a rear cross-sectional view of a gel layer in response to an applied force from a foot.
Figure 6:
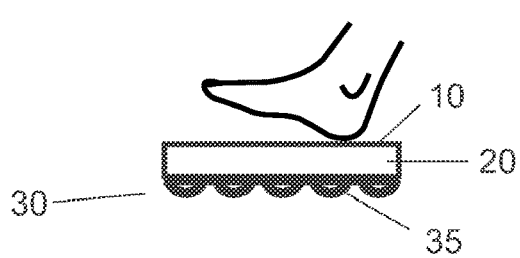
FIG. 6 is an illustration of a rear cross-sectional view of a three-layer embodiment structure of the invention responding to an applied force from a foot.
Figure 6:
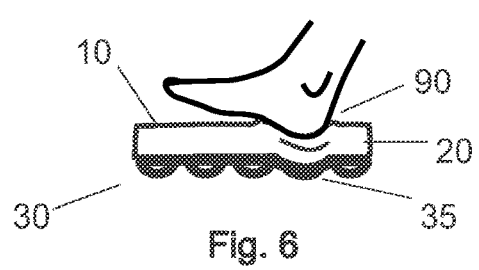

Not wishing to be bound by any theory, it is believed the invention enhances shock absorption due to the combination effects of the soft gel 20 with the damper layer 30. Such a soft gel layer, when subject to an impact, will bend and compress, and also respond somewhat like an incompressible fluid. In response to a compressive force, the gel layer 20 internal network is compressed, and the silicone gel is squeezed away from the impact area, resulting in a thinning of the gel layer 20 beneath the impact, and an expansion or swelling in the layer 20 surrounding the impact area 90. See FIGS. 6 and 7; see also FIGS. 3A and 3B. This swollen volume exerts an outward lateral force in the surrounding gel layer 20, and the gel layer 20 will expand outwardly away from the impact area until the forces equilibrate, similar to the response of an air mattress to an impact. In a limited surface area, such as a shoe insole, the gel layer 20 can expand outwardly beyond the layer's edge. See FIG. 1B and FIGS. 3A and 3B. As shown, the impact from a foot compresses the gel layer 20 beneath the impact location, which further compresses and dampers 35 located near the point of impact. The gel layer adjacent to the impact swells and the gel is squeezed away from the point of impact. The gel squeeze can move the gel layer beyond the edge of the structure, as shown. Note that as shown in FIG. 1B, the layered structure 1 is in contact with a lower layer 600, on which the layered structure 1 is supported. For instance, for a shoe insole shock absorbing structure, the layer 600 represents the shoe sole area.

Figure 7:
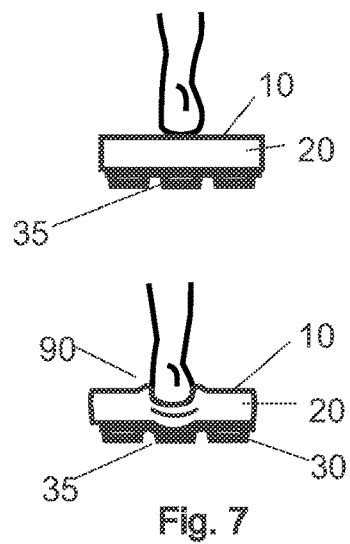
FIG. 7 is a rear cross-sectional view of the three-layer structure in FIG. 6 responding to an applied force from a foot.

An impact results in a thinning of the gel beneath the location of impact and swelling of the gel in the area surrounding the foot; see FIG. 7. With a sufficiently soft gel, the impact results in a lateral outward force in the gel, creating a wavelike action within the gel layer as the swelling expands outwardly, and can traverse the gel layer to the edge of the layer. Depending on the force of impact or the location of the impact, the gel layer can swell beyond the edge of the shock absorbing structure 1. See FIG. 1B.

With the impact removed, an internal restoring force is present in the vacated area, and the internal adhesive forces in the gel will naturally move the gel back into the evacuated area, restoring the gel layer 20 to its pre-impact configuration. If the gel layer is too hard, the swelling will not translate through the layer, and if very hard, like a silicone rubber, the middle layer will act as a solid; compressing and swelling will be very limited, if present at all. Hence, with a soft gel layer 20, the kinetic forces are absorbed at the impact zone and far beyond the impact zone.

The hollow dampers 35 below the impact area will compress. See FIG. 1B and FIGS. 6 and 7. The dampers 35 adjacent to the impact zone will bend in response to the bending of the gel layer 20 and the swelling of the gel layer 20; see FIG. 1B. As the gel swelling traverses through the gel layer 20, dampers 35 distant from the impact zone will also bend and compress. The wave action in the gel layer is imposed on the damper layer 30, which is adhered to the gel layer 20. Distant damper forms 35 will then bend and compress. The movement may not be large, but the movement of the combined damper layer 30 and gel layer 20 distributes the applied kinetic energy across much of the shock absorbing structure 1, greatly enhancing the shock absorbing capacity of the structure 1.

Figure 5A:
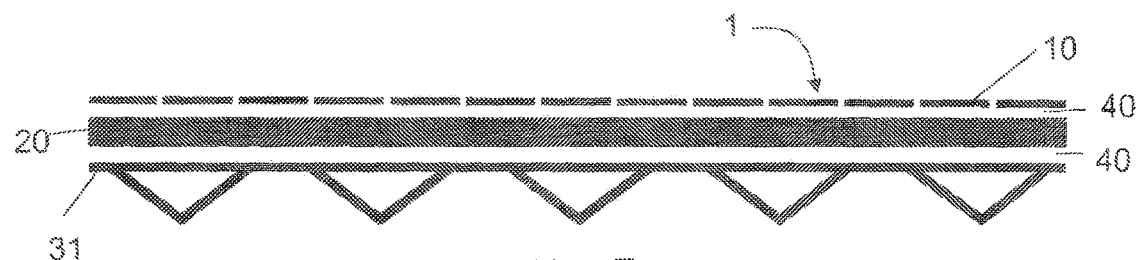
FIG. 5A is a cross-sectional side view of the layered structure shown in FIG. 4A.
Figure 5B:
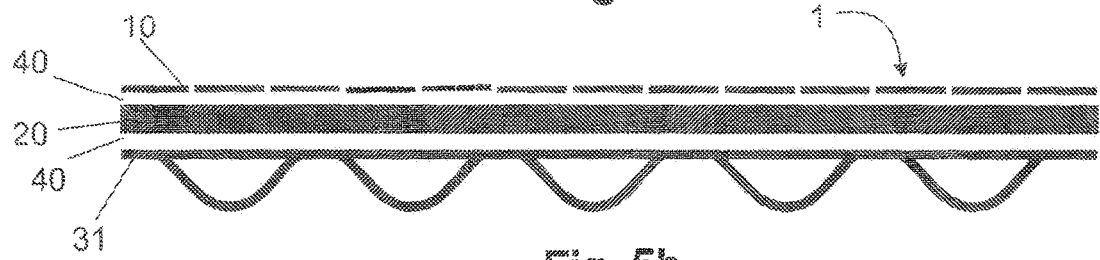
FIG. 5B is a cross-sectional side view of the layered structure shown in FIG. 4B.
Figure 5C:
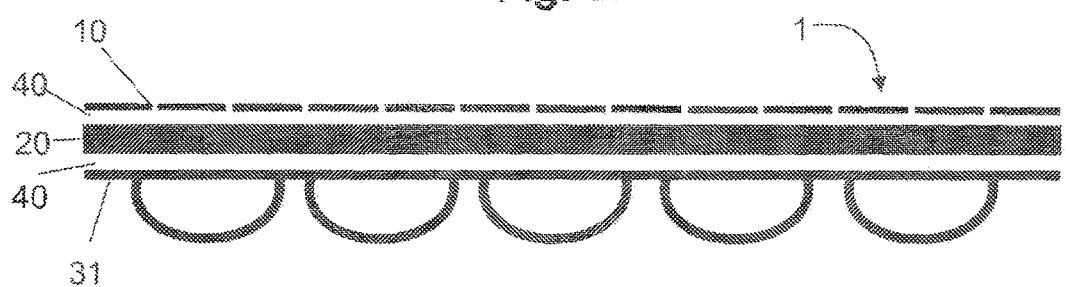
FIG. 5C is a cross-sectional side view of the layered structure shown in FIG. 4C.
Figure 10:
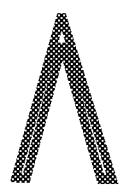
FIG. 10 is a cross-sectional view of a triangular V-shaped damper form.
Figure 11:
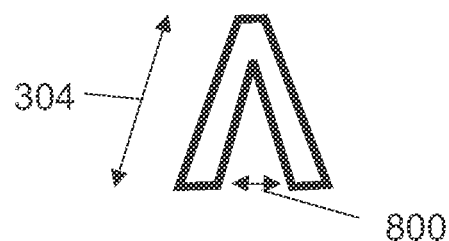
FIG. 11 is a side view of another triangular V-shaped form.

The invention can be modified for a particular application. As shown in FIG. 4A, one embodiment of a damper layer 30 has a series of dampers 35 positioned in a pattern where the dampers are in parallel rows along the length of the damping layer 30. This pattern or configuration can be modified as desired; for instance, dampers 35 can be located in concentric rings around a point of repeated impact, or alternatively, radiating away from a point of repeated impact, such as near the ball of the foot area in a shoe insole application. The distance between dampers 35 can be varied, as well as the distance between damper rows, as needed for a given application. Each damper 35 has a height, length, and thickness which can be modified as needed for a particular application. For instance, see the triangular "V" dampers shown in FIGS. 10 and 11, which vary in thickness. Thicker dampers 35 are stiffer and more useful for absorbing large kinetic forces, so it may be desirable to place thicker dampers near the heel and ball areas of the foot in a shoe insole or insert. Different geometric figures may be used, for instance hollow triangular cross-sectional dampers or V-shaped dampers are shown in FIG. 4A, half cylinder dampers shown in FIG. 4B, and hemispherical dampers in FIG. 4C. Cross-sections are shown in FIGS. 5A, 5B, and 5C. The dampers 35 do not have to be uniform in the damping layer 30, and the density of damper forms, shapes of the forms, or material of the damper forms 35 can vary across the damping layer 30. Suitable materials for the dampers 35 may include, without limitation: polymers, polyurethanes, dense foams, rubber, carbon fiber composites, and durable, flexible materials or the above-mentioned thermoplastic elastomers.

The laminated structure 1 may conform to a plurality of shapes based on the application, including, without limitation, a concave shape, a convex shape, an inverted shape, and a wave shape, or any combination. The laminated structure 1 may form a contour to conform to any orientation or direction of the expected shock force to be applied.

Other variations can include a gel layer that varies in thickness across the layer 20 or varies in hardness across the gel layer 20. Additional shock absorbing layers may be positioned above the gel layer 20, in parts or across the entire layer 20. Individual dampers 35 may vary in shape, height, or thickness. For instance, it may be desirable to have the dampers 35 thicken near the damping base layer 31.

Figure 8:
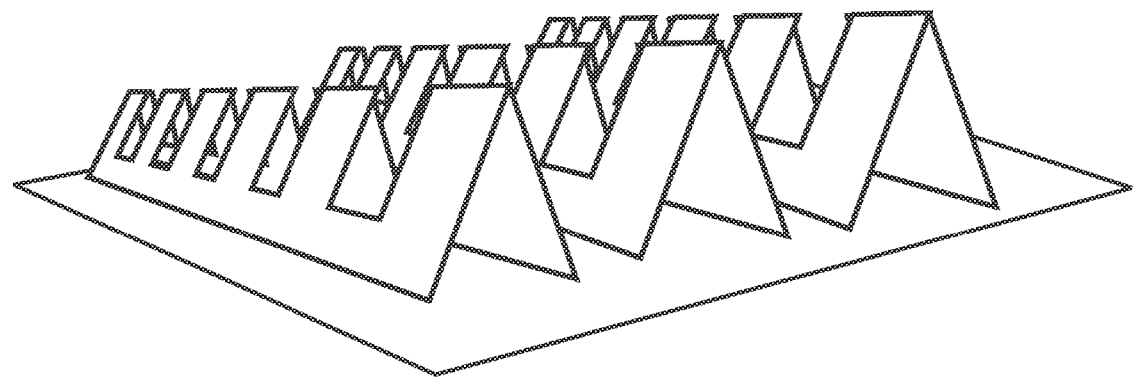
FIG. 8 is a top perspective view of one embodiment of the damper layer with joined triangular V-shaped forms.
Figure 9:
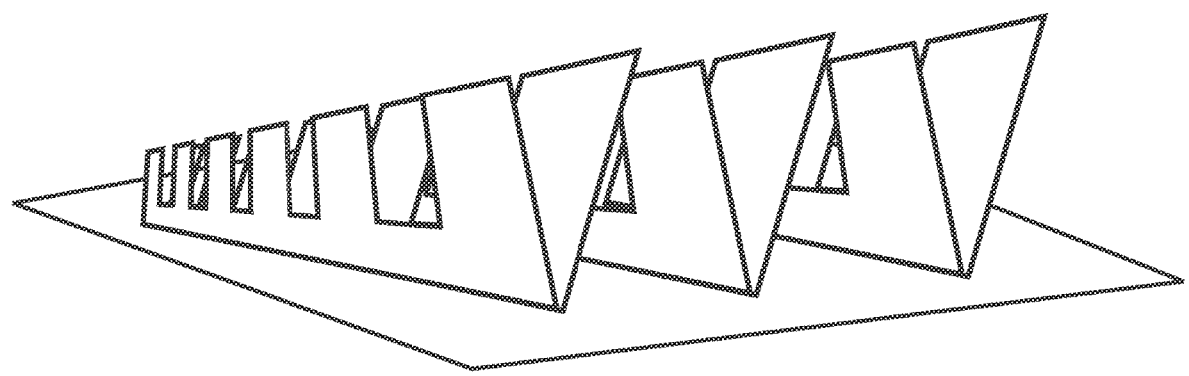
FIG. 9 is a top perspective view of another embodiment of the damper layer with inverted joined triangular V-shaped forms.
Figure 12:
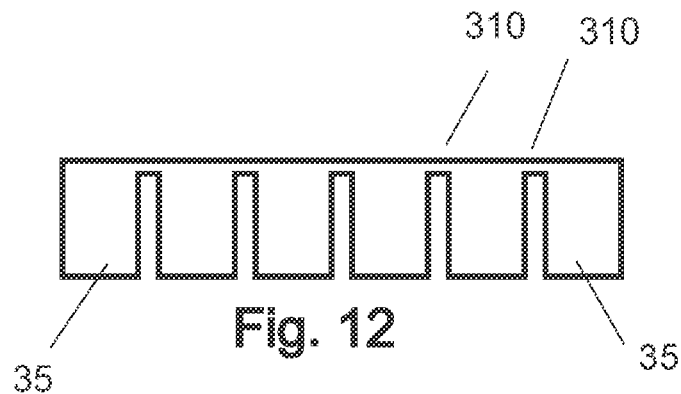
FIG. 12 is a side view of one embodiment of joined or bridged dampers.
Figure 13:
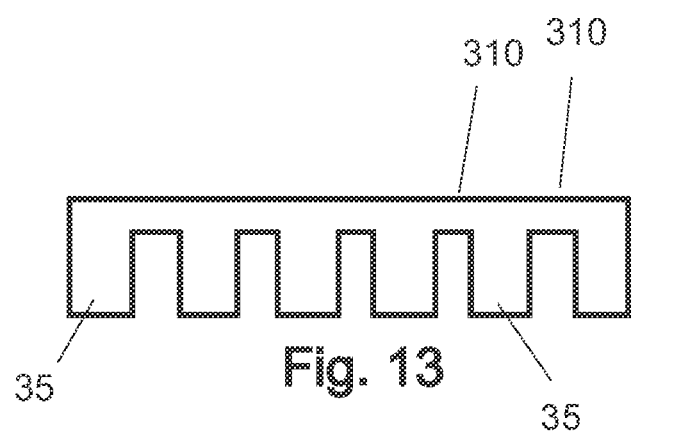
FIG. 13 is a side view of another embodiment of joined or bridged dampers.

Those skilled in the art, in light of the present teachings, will recognize that a damper with a greater height may provide additional surface area to damp shock impulses and dissipate kinetic energy. However, the stiffness of the damper material, and the damper shape may also contribute to the efficacy of the shock absorbance. In some embodiments, the damper 35 open shape has a gap width 800 between two sides of the damper; see FIG. 11. The gap width 800 may vary across the damper 35. The gap width 800 may close where the opposing sides of a damper 35 join. In some embodiments, the damper 35 may include a top portion that extends outwardly to provide additional length to the damper. In some embodiments, the damper may include an extension portion that extends upwardly, thereby providing additional height. The extension portion may be detachable. Those skilled in the art, in light of the present teachings, will recognize that extending the top portion may allow the damper device to be utilized in additional objects. In some embodiments, the damper may include a segment portion that forms a gap along the side of the damper. The segment portion may be flexed and/or shaped to fit varying contours to mitigate distortion. Additionally, the damper material can be varied across the damper layer. In some embodiments, the dampers may be joined together in a damper row as an extension of the top portion, or a bridge portion, such as shown in FIGS. 12 and 13 with bridge portions connecting adjacent dampers. V- or inverted V-shaped bridge dampers are shown in FIGS. 7 and 8. Such a joined row allows for ready transmission of an applied force to one damper 35 across the entire damper row for joined dampers.

The ability to vary damping structures allows the constructions of a layer that is designed for a specific purpose, such as a shoe insole or insert, helmet, baseball glove, or another device, or designed for a specific person. In some embodiments, the damper device may provide damping functions to numerous objects and machinery that receive stress or force, including, without limitation: a shoe, a shin guard, a helmet, a tire, a vehicle strut, a gear mechanism, and a bed.

Those skilled in the art, in light of the present teachings, will recognize that the laminated damper structure may be flexible enough to squeeze into tight spaces and have sufficient tensile strength to stretch along the longitudinal axis of longer objects. For instance, the damper structure shown in FIG. 1A uses a silicone gel mat that is 4 mm (⅛") thick, the dampers are formed of thermoplastic polyurethane and measure 5 mm tall and 10 mm long, the damper base is 1 mm thick, and the top fabric is 1 mm thick. The overall laminated structure is about 10-11 mm thick, a suitable thickness for a shoe insole or shoe insert.

In alternative embodiments, the dampers can be "A" shaped, "T" in cross-section, or any suitable shape or geometry, including non-hollow or solid figure dampers. In some embodiments, the damper 35 may include a thickness 304. The thickness may change as forces compress and expand the damper and the increased thickness may increase force dampening. In some embodiments, the damper may further include a gap width 800. The gap width may include a termination point from which the damper tapers outward to a distal point where the damper is at a widest gap width. A wider gap width may allow for contouring while mitigating distortion to the dampening elements. Distortion may affect dampening. In some embodiments, the damper may include a top portion that extends outwardly to provide additional height to the damper. In some embodiments, the damper may include an extension portion 310 that joins with the top portion, thereby providing additional length. The extension portion may be detachable. Those skilled in the art, in light of the present teachings will recognize that extending the top portion may allow the damper device to be utilized in additional objects. In some embodiments, the damper may include a segment portion that forms a gap along the side of the damper; see FIG. 8.

In other embodiments, a porous, soft foam may replace the gel layer. The foam layer may be filled with a gel to increase its shock absorbency. A series of individual dampers 35 may also be joined together in a bottom bridging or middle bridging extension to increase the response of the dampers to movement in the gel layer 20.

In the present embodiment, the orientation of the damping device in a shoe may be tailored to accommodate different shoes with different functions. For example, without limitation, a dress shoe may require a damping device along the longitudinal axis of the shoe for simple walking, while a basketball shoe may require the damping device to orient both along a longitudinal axis and along a latitudinal axis to account for lateral movements that are required while playing basketball. In some embodiments, the damper may be curved, convex, and concave to provide various types of damping capacity.

In one alternative embodiment of the present invention, the damping device may position inside a box used for shipping fragile items. In this manner, the objects may receive additional cushioning during travel. In yet another alternative embodiment, the damping device may be fabricated into one large piece and provide a shock absorber for a vehicle. In yet another alternative embodiment, a plurality of damping devices may be stacked to reinforce each other. In yet another alternative embodiment, the substantially V-shape of the damper may be utilized to reinforce a building against shocks from an earthquake. The height, gap width, thickness, and length may be manipulated to position between layers of a wall.

All the features or embodiment components disclosed in this specification, including any accompanying abstract and drawings, unless expressly stated otherwise, may be replaced by alternative features or components serving the same, equivalent, or similar purpose as known by those skilled in the art to achieve the same, equivalent, suitable, or similar results by such alternative feature(s) or component(s) providing a similar function by virtue of their having known suitable properties for the intended purpose. Thus, unless expressly stated otherwise, each feature disclosed is one example only of a generic series of equivalent, suitable, or similar features known or knowable to those skilled in the art without requiring undue experimentation.

Having fully described at least one embodiment of the present invention, other equivalent or alternative methods of implementing a combined semi-fluid layer with a damping layer will be apparent to those skilled in the art. Various aspects of the invention have been described above by way of illustration, and the specific embodiments disclosed are not intended to limit the invention to the particular forms disclosed. By way of example, and not limitation, the substantially V-shaped damping device that comprises sufficient flexibility and durability to contour an eclectic assortment of objects described in the foregoing was principally directed to a substantially V-shaped damping device that comprises sufficient flexibility and durability to contour an eclectic assortment of objects, and includes various dimensions and configurations implementations; however, similar techniques may instead be applied to packaging materials to protect mailed items from damage, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering is not intended to and should not be taken to indicate the ordering of elements and/or steps in the claims.

The invention claimed is:

1. An apparatus comprising: a first layer with a top portion and a bottom portion, and a second layer with a top portion and a bottom portion consisting of a hock absorbing gel layer, a second layer being positioned below said first layer and adhesively joined along the top portion of the second layer and bottom portion of the first layer; a third layer positioned below said second layer, said third layer having a top portion adhesively joined with the bottom portion of the second layer, said third layer having a bottom portion on which a series of dampers are positioned, said dampers formed of elastomeric materials, each damper shaped to be compressible, each damper having at least one sidewall extending outwardly from the bottom portion of the third layer and each damper having a closed top portion, where said shock absorbing gel is a soft gel having a shore OO hardness is in the range of 0-60, and where the shock absorbing gel remains compressible and soft during a shock impact.

2. The apparatus of claim 1 wherein the shock absorbing gel layer is a silicone gel layer with a Shore 00 hardness in the range of 0-40.

3. The apparatus of claim 2 where the silicone gel layer with a Shore 00 hardness in the range of 15-35.

4. The apparatus of claim one further comprising a shoe insole, an insole insert, a glove, a baseball glove, or safety equipment.

5. The apparatus of claim 3 where the dampers comprise a thermoplastic elastomer.

6. The apparatus of claim 5 where a subset of the dampers are closed hollow forms.

7. The apparatus of claim 6 where the hollow forms comprise triangular V shaped forms, or half cylinder shaped forms, or hemispherical shaped formed, each damper having a height, length, and thickness.

8. The apparatus of claim 6 where the third layer comprises a thermoplastic elastomer.

9. The apparatus of claim 6 where the third layer and dampers are integrally formed.

10. The apparatus of claim 6 where the dampers are positioned in a pattern on the third layer where the pattern comprises one of more rows of adjacent hollow forms.

11. The apparatus of claim 10 where a second subset of dampers in at least one of the rows are joined together with an elastomeric bridge.

12. The apparatus of claim 7 where the height, length and thickness varies.

13. The apparatus of claim 1 where said gel layer, when uncompressed, forms a solid layer.

14. The shock absorbing structure of claim 1, where the dampers are not closed structures.

15. An apparatus comprising: a first layer with a top portion and a bottom portion, and a second layer with a top portion and a bottom portion comprising a shock absorbing gel layer, said second layer being positioned below said first layer and adhesively joined along the top portion of the second layer and bottom portion of the first layer, where the gel layer has a thickness, the gel layer thickness is configured to thin in thickness below a shock load location in response to as shock load being applied at the shock load location and the gel layer configured to swell in thickness adjacent to the shock load location in response to the applied shock load at the shock load location; a third layer positioned below said second layer, said third layer having a top portion adhesively joined with the bottom portion of the second layer, said third layer having a bottom portion on which a series of dampers are positioned, said dampers formed of elastomeric materials, each damper designed to be compressible, each damper having at least one sidewall extending outwardly from the bottom portion of the third layer and each damper having a closed top portion, where said shock absorbing gel is a soft gel having a shore OO hardness is in the range of 0-60, and where the shock absorbing gel remains compressible and soft during a shock impact.

16. The apparatus of claim 15 where the gel layer is configured to swell throughout the gel layer away from the applied shock location in response to the applied shock load at the shock load location.

17. The apparatus of claim 16 where the apparatus has at least one edge, and the gel layer is configured to swell beyond the at least one edge in response to the applied shock load at the shock load location.

18. The apparatus of claim 16 where the dampers positioned away from the shock load location are designed to bend in response to an applied shock load at the shock load location.

19. The apparatus of claim 15 where the gel layer is a silicone gel layer of hardness on the Shore 00 scale in the range of 13-35.

20. The apparatus of claim 19 where the dampers are constructed of a thermoplastic elastomer.

21. The apparatus of claim 20 where the dampers comprise hollow forms.

22. The apparatus of claim 21 where a subset of the dampers are closed hollow forms.

23. The apparatus of claim 15 where the dampers below the shock load location are designed to compress in response to the applied shock load at the shock load location.

24. The apparatus of claim 15 where said gel layer, when uncompressed, forms a solid layer.

25. An apparatus comprising: a first layer with a top portion and a bottom portion, and a second layer with a top portion and a bottom portion consisting of a shock absorbing gel layer, said second layer being positioned below said first layer and adhesively joined along the top portion of the second layer and bottom portion of the first layer, where the gel layer has a thickness, the gel layer thickness is configured to thin in thickness below a shock load location in response to a shock load being applied at the shock load location and the gel layer configured to swell in thickness adjacent to the shock load location in response to the applied shock load at the shock load location; a third layer positioned below said second layer, said third layer having a top portion adhesively joined with the bottom portion of the second layer, said third layer having a bottom portion on which a series of dampers are positioned, said dampers formed of elastomeric materials, each damper designed to be compressible; said second layer and said first layer designed to adsorb kinetic energy applied by the applied shock load at the shock load location, where the kinetic energy is adsorbed in a volume of the shock absorbing structure greater than the volume of the shock adsorbing structure below the applied shock location.

26. The apparatus of claim 25 where said gel layer, when uncompressed, forms a solid layer.

* * * * *